(12) United States Patent
Mizutani et al.

(10) Patent No.: US 10,263,484 B2
(45) Date of Patent: Apr. 16, 2019

(54) STATOR OF ROTARY ELECTRIC MACHINE

(71) Applicants: TOYOTA JIDOSHA KABUSHIKI KAISHA, Toyota-shi, Aichi-ken (JP); DENSO CORPORATION, Kariya-shi, Aichi-ken (JP)

(72) Inventors: Tetsushi Mizutani, Nagoya (JP); Keiichi Kaneshige, Seto (JP); Masayuki Ikemoto, Anjo (JP); Tsutomu Hatakeyama, Toyota (JP); Akiya Shichijoh, Yatomi (JP)

(73) Assignees: TOYOTA JIDOSHA KABUSHIKI KAISHA, Toyota-shi, Aichi-ken (JP); DENSO CORPORATION, Kariya-shi, Aichi-ken (JP)

( * ) Notice: Subject to any disclaimer, the term of this patent is extended or adjusted under 35 U.S.C. 154(b) by 232 days.

(21) Appl. No.: 15/108,070

(22) PCT Filed: Dec. 22, 2014

(86) PCT No.: PCT/IB2014/002855
§ 371 (c)(1),
(2) Date: Jun. 24, 2016

(87) PCT Pub. No.: WO2015/097528
PCT Pub. Date: Jul. 2, 2015

(65) Prior Publication Data
US 2016/0329764 A1 Nov. 10, 2016

(30) Foreign Application Priority Data
Dec. 27, 2013 (JP) ................... 2013-271421

(51) Int. Cl.
*H02K 3/04* (2006.01)
*H02K 3/50* (2006.01)
(Continued)

(52) U.S. Cl.
CPC ............... *H02K 3/04* (2013.01); *H02K 1/146* (2013.01); *H02K 1/16* (2013.01); *H02K 3/12* (2013.01);
(Continued)

(58) Field of Classification Search
CPC .. H02K 3/12; H02K 3/28; H02K 3/50; H02K 3/52; H02K 3/522; H02K 3/46
See application file for complete search history.

(56) References Cited

U.S. PATENT DOCUMENTS 7,948,130 B2 * 5/2011 Kitagawa ............... H02K 3/522
310/71
8,339,001 B2 * 12/2012 Ghodsi-Khameneh ......................
H02K 3/28
310/416
(Continued)

FOREIGN PATENT DOCUMENTS

JP 2003-324887 A 11/2003
JP 2013-009495 A 1/2013
(Continued)

*Primary Examiner* — Tran N Nguyen
(74) *Attorney, Agent, or Firm* — Sughrue Mion, PLLC

(57) ABSTRACT

A stator for a rotary electric machine includes a stator core, three-phase coils, and a neutral point connection conductor. The three-phase coils are wound around the stator core. The neutral point connection conductor is connected to each of the three-phase coils. The neutral point connection conductor includes a linear conductor that is bent. The linear conductor includes two end portions and an overlapping portion in which the conductor is folded back and doubled up. One of the two end portions is connected to one-phase coil of the three-phase coils. The other of the two end portions is connected to another-phase coil of the three-phase coils. The overlapping portion is connected to the remaining-phase coil of the three-phase coils.

4 Claims, 7 Drawing Sheets

(51) Int. Cl.
  *H02K 3/12* (2006.01)
  *H02K 1/14* (2006.01)
  *H02K 1/16* (2006.01)

(52) U.S. Cl.
  CPC .......... *H02K 3/50* (2013.01); *H02K 2203/09* (2013.01); *H02K 2213/03* (2013.01)

(56) References Cited

U.S. PATENT DOCUMENTS

| | | | | |
|---|---|---|---|---|
| 8,471,419 | B2* | 6/2013 | Shimomura | H02K 1/148 |
| | | | | 29/596 |
| 8,519,583 | B2* | 8/2013 | Sakaue | H02K 3/522 |
| | | | | 310/184 |
| 9,735,639 | B2* | 8/2017 | Shim | H02K 3/28 |
| 2010/0141065 | A1 | 6/2010 | El Baraka et al. | |
| 2010/0141067 | A1* | 6/2010 | Kitagawa | H02K 3/522 |
| | | | | 310/71 |
| 2012/0019081 | A1 | 1/2012 | Tamura et al. | |
| 2014/0091655 | A1 | 4/2014 | Kajita et al. | |

FOREIGN PATENT DOCUMENTS

| | | |
|---|---|---|
| JP | 2013-102596 A | 5/2013 |
| JP | 2013-201896 A | 10/2013 |
| WO | 2013/102961 A1 | 7/2013 |

* cited by examiner

STATOR OF ROTARY ELECTRIC MACHINE

BACKGROUND OF THE INVENTION

1. Field of the Invention

The invention relates to a stator of a rotary electric machine, and more particularly, to a stator in which three-phase coils are connected by a neutral point connection conductor.

2. Description of Related Art

Japanese Patent Application Publication No. 2013-102596 (JP 2013-102596 A) describes three-phase coils being connected using a neutral point connection conductor in which a flat plate-like metal member has been press-formed into an annular shape.

SUMMARY OF THE INVENTION

A neutral point connection conductor for connecting three-phase coils tends to be complex in shape, and the manufacturing process thereof also tends to be complex. With the neutral point connection conductor described in JP 2013-102596 A as well, a flat plate-like metal member must be press-formed into an annular shape, making the manufacturing process complex.

The invention thus provides a stator of a rotary electric machine in which the manufacture of a neutral point connection conductor for connecting a three-phase coil is easy.

The stator of a rotary electric machine according to the invention employs the means described below to achieve the object described above.

One aspect of the invention relates to a stator for a rotary electric machine that includes a stator core, three-phase coils, and a neutral point connection conductor. The three-phase coils are wound around the stator core. The neutral point connection conductor is connected to each of the three-phase coils. The neutral point connection conductor includes a linear conductor that is bent. The linear conductor includes two end portions and an overlapping portion in which the conductor is folded back and doubled up. One of the two end portions is connected to one-phase coil of the three-phase coils. The other of the two end portions is connected to another-phase coil of the three-phase coils. The overlapping portion is connected to the remaining-phase coil of the three-phase coils. According to this aspect, the neutral point connection conductor for connecting the three-phase coils is able to be formed by bending a single linear conductor, so manufacture is able to be simplified.

In the one aspect of the invention, an end portion of the overlapping portion in an axial direction of the stator may include a bent portion resulting from the conductor being folded back, and the bent portion may be positioned farther in the axial direction of the stator than the two end portions of the linear conductor. According to this aspect, a decrease in joinability due to the overlapping portion of the neutral point connection conductor being joined to the coil at the bent portion is able to be avoided, so the joinability of the neutral point connection conductor and the coil is able to be improved.

As described above, the invention provides a stator of a rotary electric machine in which the manufacture of a neutral point connection conductor for connecting a three-phase coil is easy.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a mode for carrying out the invention (hereinafter referred to as an "example embodiment") will be described with reference to the accompanying drawings.

Figure 1:
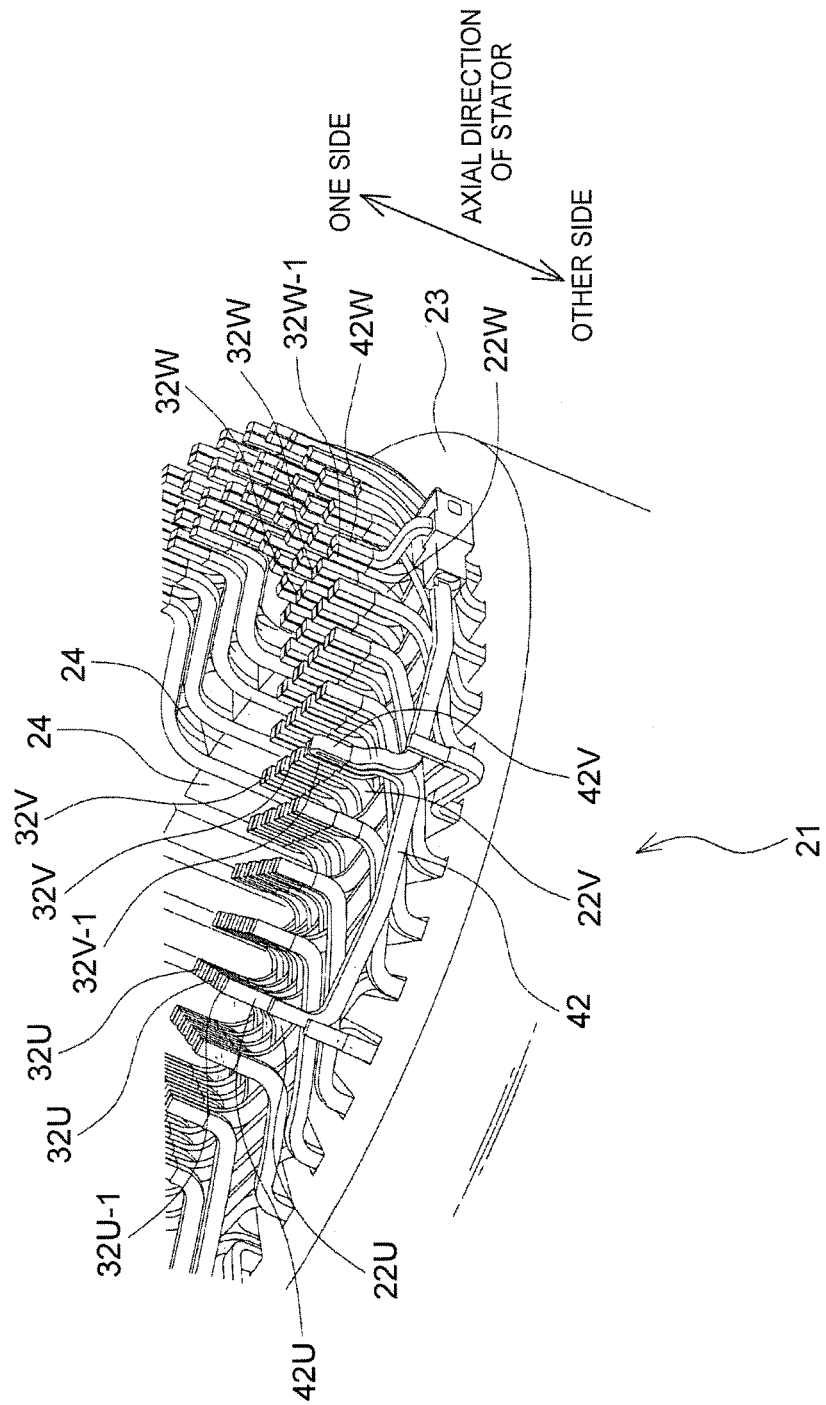
FIG. 1 is a perspective view of an example of the overall structure of a stator according to an example embodiment of the invention.
Figure 2:
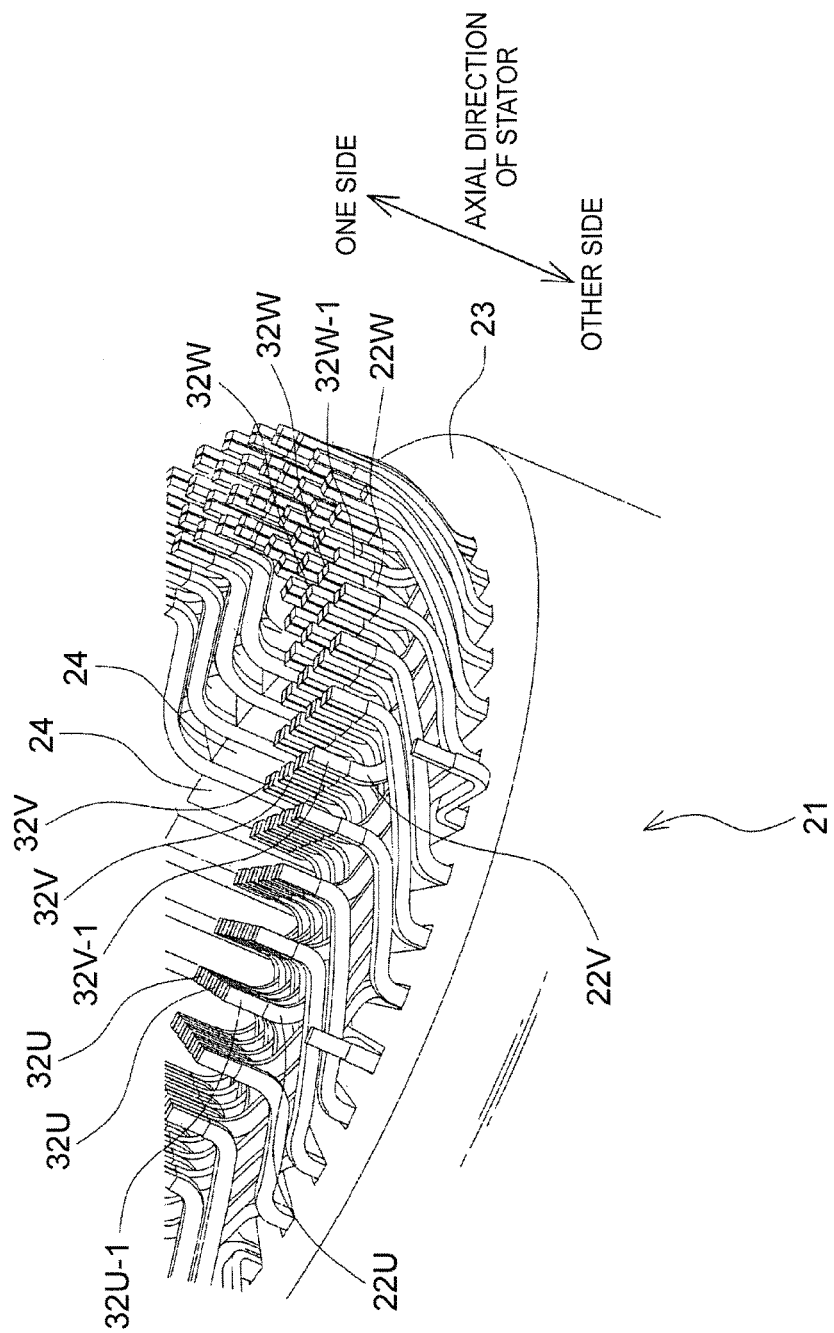
FIG. 2 is a view of an example of the structure of a stator core and segment coils.
Figure 3:
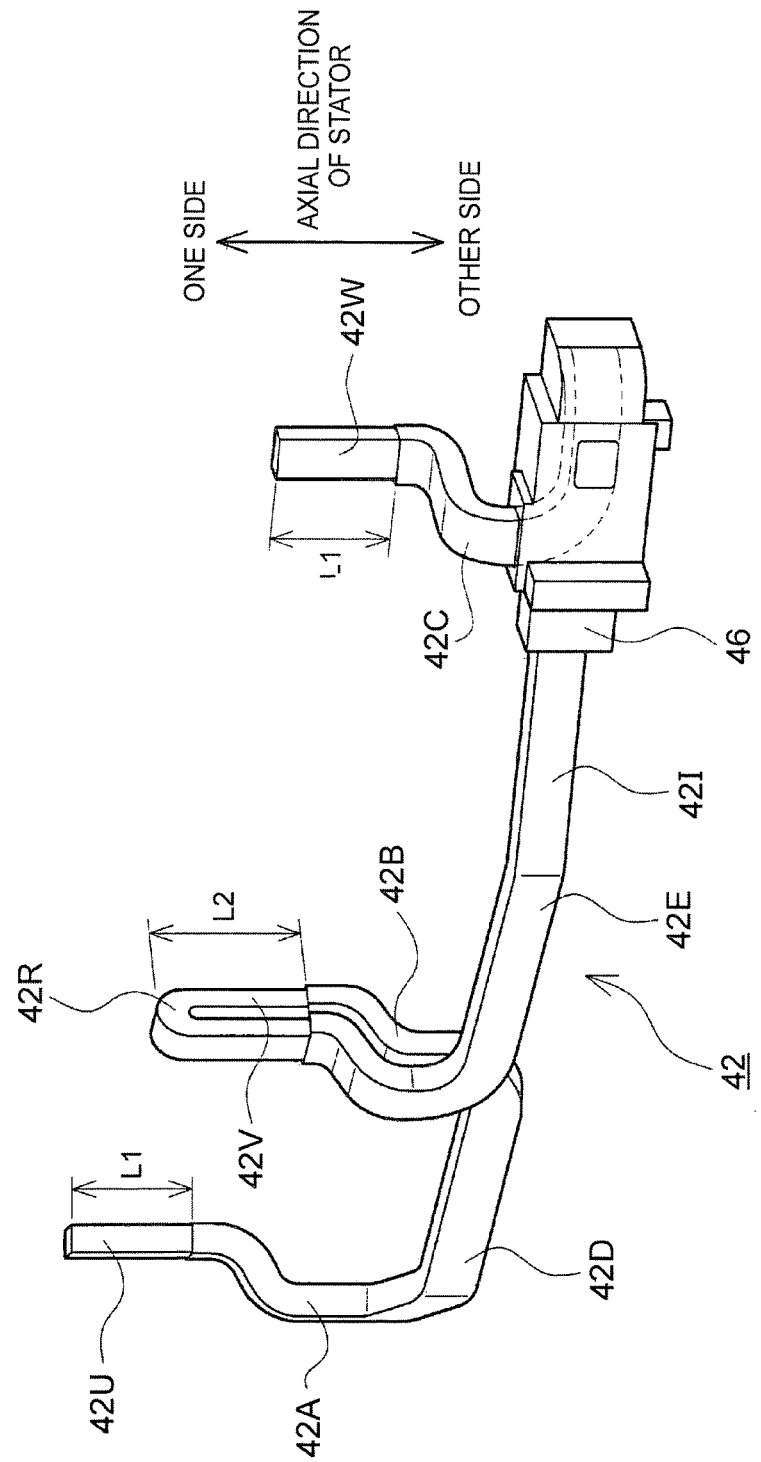
FIG. 3 is a view of an example of the structure of a neutral point bus bar.

FIGS. 1 to 3 are views of the general structure of a stator of a rotary electric machine according to one example embodiment of the invention. FIG. 1 is a perspective view of the overall structure of the stator. FIG. 2 is an example of the structure of a stator core 21 and segment coils 22U, 22V, and 22W. FIG. 3 is an example of the structure of a neutral point bus bar 42. In FIGS. 1 and 2, only a portion of the structure of the stator core 21 and the segment coils 22U, 22V, and 22W in the circumferential direction of the stator is shown, but the structure of the remaining portion that is not shown is the same as the structure of the portion that is shown.

The stator includes the stator core 21, the three-phase segment coils 22U, 22V, and 22W that are wound around the stator core 21, and the neutral point bus bar (i.e., a neutral point connection conductor) 42 for joining one end portion of each of the three-phase segment coils 22U, 22V, and 22W together as a neutral point, i.e., for making the three-phase segment coils 22U, 22V, and 22W a Y-connection (star connection). The stator core 21 includes an annular yoke 23 that extends along in the circumferential direction of the stator, and a plurality of teeth 24 that protrude farther toward a radially inner side of the stator (i.e., the side toward a rotor, not shown) than an inner peripheral surface of the yoke 23. The plurality of teeth 24 are arranged at intervals (equally-spaced intervals) in the circumferential direction of the stator. Slots are formed between adjacent teeth 24 in the circumferential direction of the stator, and the segment coils 22U, 22V, and 22W are wound around the teeth 24 through these slots. A conductor of each of the segment coils 22U, 22V, and 22W has a rectangular cross-section. For example, flat wire having a rectangular cross-section is used for the conductor, but square wire having a generally square cross-section may also be used. With the segment coil 22U, coil end portions that pass through slots in different positions in the circumferential direction of the stator and protrude farther toward one side in the axial direction of the stator than the stator core 21 (i.e., the teeth 24 and the yoke 23) are bent in the circumferential direction of the stator, and tip end portions of coil end portions are joined together. Similarly, with the segment coils 22V and 22W as well, tip end portions of coil end portions that protrude farther toward one side in the axial direction of the stator than the stator core 21 are joined together. Connecting portions 32U, 32V, and 32W of the segment coils 22U, 22V, and 22W, respectively, extend along in the axial direction of the stator.

The neutral point bus bar 42 is electrically connected to each of the three-phase segment coils 22U, 22V, and 22W. A conductor of the neutral point bus bar 42 also has a rectangular cross-section. For example, flat wire having a rectangular cross-section is used for the conductor, but square wire having a generally square cross-section may also be used. In the example shown in FIGS. 1 and 2, one connecting portion 32U of the segment coil 22U, one connecting portion 32V of the segment coil 22V, and one connecting portion 32W of the segment coil 22W are used as connection terminals 32U-1, 32V-1, and 32W-1, respectively, that connect to the neutral point bus bar 42. The connection terminals 32U-1, 32V-1, and 32W-1 of the segment coils 22U, 22V, and 22W are arranged at intervals in the circumferential direction of the stator. The lengths of these connection terminals 32U-1, 32V-1, and 32W-1 in the axial direction of the stator are the same, so the positions of the connection terminals 32U-1, 32V-1, and 32W-1 in the axial direction of the stator match.

In this example embodiment, the neutral point bus bar 42 is formed by a single continuous linear conductor that is bent. The neutral point bus bar 42 has an overlapping portion 42V where the conductor is folded back and doubled up, between one end portion 42U and the other end portion 42W of the neutral point bus bar 42. The conductor of the neutral point bus bar 42, except for at both end portions 42U and 42W and the overlapping portion 42V, is covered by an insulation coating 42I. The one end portion 42U and the other end portion 42W of the neutral point bus bar 42 are arranged spaced apart from each other in the circumferential direction of the stator, and extend along in the axial direction of the stator. The one end portion 42U and the other end portion 42W (conductor portions not covered by the insulation coating 42I) of the neutral point bus bar 42 have the same length in the axial direction of the stator and are in matching positions in the axial direction of the stator. The overlapping portion 42V is arranged in a position between the one end portion 42U and the other end portion 42W in the circumferential direction of the stator. The overlapping portion 42V extends along in the axial direction of the stator, with the conductor overlapping with itself and doubled up in the radial direction of the stator. A bent portion 42R resulting from the conductor being folding back is formed at an end portion on one side of the overlapping portion 42V in the axial direction of the stator. An axial length L2 of the overlapping portion 42V that includes the bent portion 42R (a conductor portion not covered by the insulation coating 42I) in the axial direction of the stator, is longer than an axial length L1 of the one end portion 42U and the other end portion 42W (conductor portions not covered by the insulation coating 42I) in the axial direction of the stator, so the overlapping -portion 42V (i.e., the bent portion 42R) protrudes farther out to one side in the axial direction of the stator than the one end portion 42U and the other end portion 42W. In the example in FIG. 3, a thermistor (temperature sensor) 46 covered in molded resin is attached to the neutral point bus bar 42. The temperature of the segment coils 22U, 22V, and 22W is able to be measured by the thermistor 46. However, the thermistor 46 may also be omitted.

Figure 4:
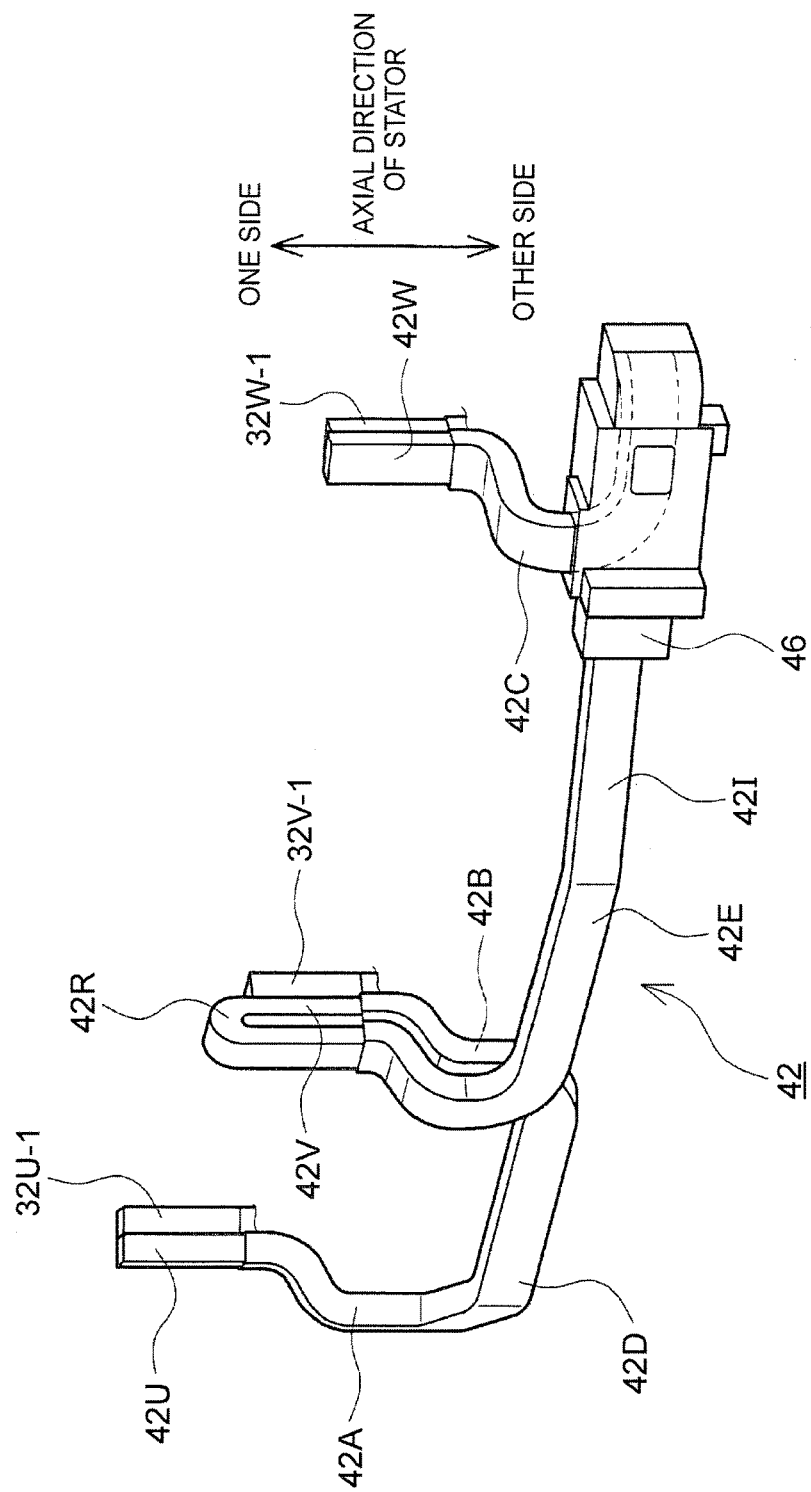
FIG. 4 is view of an example of a connection between connection terminals of the segment coils and the neutral point bus bar.
Figure 5:
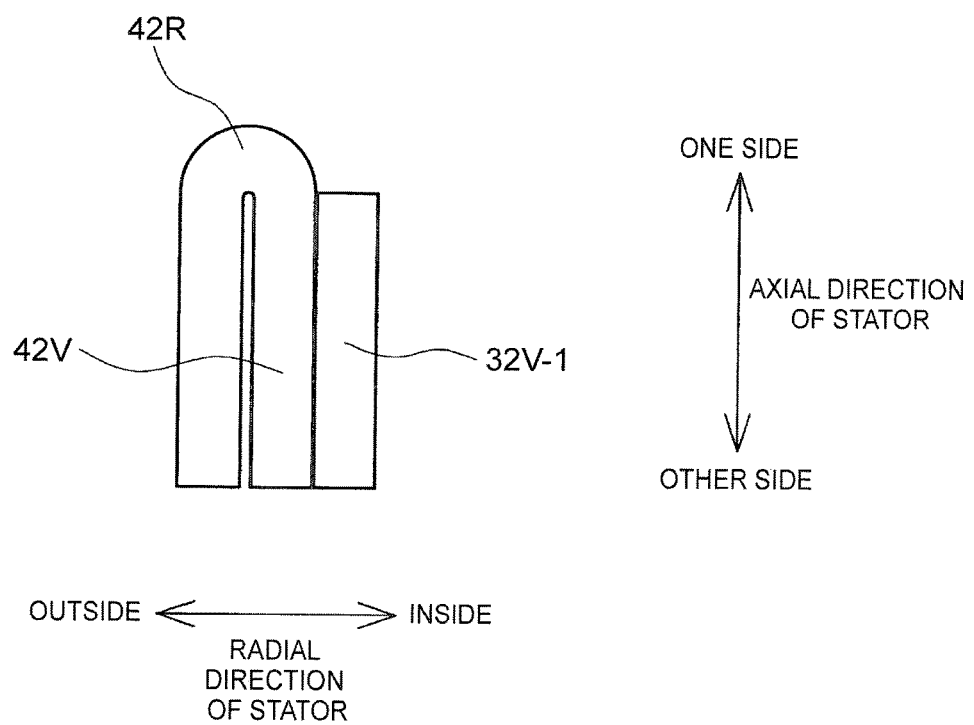
FIG. 5 is a view of an example of a connection between the connection terminal of one of the segment coils and an overlapping portion of the neutral point bus bar.

The three-phase segment coils 22U, 22V, and 22W are electrically connected to both end portions 42U and 42W and the overlapping portion 42V of the neutral point bus bar 42, respectively. For example, as shown in FIGS. 1 and 4, the connection terminal 32U-1 of the segment coil 22U and the one end portion 42U of the neutral point bus bar 42 are joined together by welding, the connection terminal 32V-1 of the segment coil 22V and the overlapping portion 42V of the neutral point bus bar 42 are joined together by welding, and the connection terminal 32W-1 of the segment coil 22W and the other end portion 42W of the neutral point bus bar 42 are joined together by welding. As a result, the three-phase segment coils 22U, 22W, and 22V are connected in a Y-connection. At this time, the overlapping portion 42V and the connection terminal 32V-1 are joined together by welding, in a state with the bent portion 42R protruding farther toward one side in the axial direction of the stator than the connection terminal 32V-1, as shown by FIGS. 4 and 5.

With the neutral point bus bar 42, a bus bar portion 42A that is positioned to the other side of the one end portion 42U in the axial direction of the stator is bent so as to be positioned farther toward the outside in the radial direction of the stator than the one end portion 42U, and a bus bar portion 42B that is positioned to the other side of the overlapping portion 42V in the axial direction of the stator is bent so as to be positioned farther toward the outside in the radial direction of the stator than the overlapping portion 42V. Also, the bus bar portions 42A and 42B are connected together via a bus bar portion 42D that extends in the circumferential direction of the stator. From the bus bar portion 42A to the bus bar portion 42D is bent from the other side in the axial direction of the stator toward one side in the circumferential direction of the stator, and from the bus bar portion 42D to the bus bar portion 42B is bent from one side in the circumferential direction of the stator toward the one side in the axial direction of the stator. Similarly, a bus bar portion 42C that is positioned to the other side of the other end portion 42W in the axial direction of the stator is bent so as to be positioned farther toward the outside in the radial direction of the stator than the other end portion 42W, and the bus bar portions 42B and 42C are connected together via a bus bar portion 42E that extends in the circumferential direction of the stator.

According to the example embodiment described above, the neutral point bus bar 42 for connecting to the connection terminals 32U-1, 32V-1, and 32W-1 of the segment coils 22U, 22V, and 22W is able to be formed simply by bending a single continuous linear conductor. Therefore, manufacturing the neutral point bus bar 42 for connecting the three-phase segment coils 22U, 22V, and 22W in a Y-connection is easy.

Figure 6:
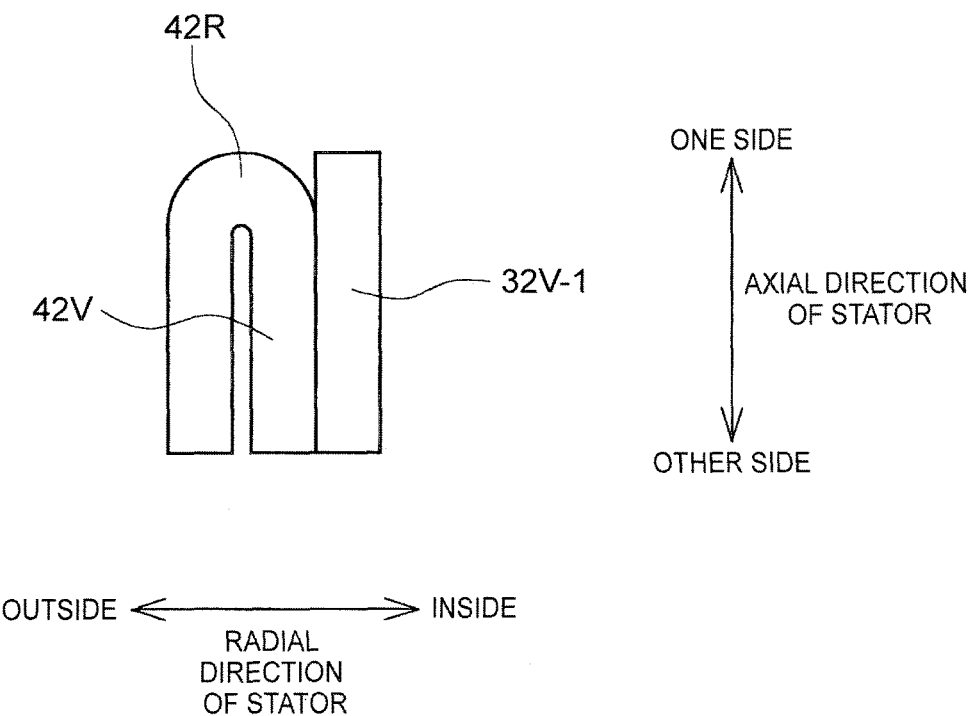
FIG. 6 is a view of an example in which joinability between the connection terminal of the one segment coil and the overlapping portion of the neutral point bus bar decreases.

If the bent portion 42R formed on the end portion in the axial direction of the stator is separated from the connection terminal 32V-1 in the radial direction of the stator, as shown in FIG. 6, when the overlapping portion 42V of the neutral point bus bar 42 is joined to the connection terminal 32V-1 of the segment coil 22V by welding, the joinability by welding between the bent portion 42R and the connection terminal 32V-1 will tend to decrease. On the other hand, with the neutral point bus bar 42 in this example embodiment, the axial length L2 of the overlapping portion 42V that includes the bent portion 42R (a conductor portion not covered by the insulation coating 42I) in the axial direction of the stator is longer than the axial length L1 of both end portions 42U and 42W (conductor portions not covered by the insulation coating 42I) in the axial direction of the stator, and the bent portion 42R protrudes out in the axial direction of the stator farther than both end portions 42U and 42W. Therefore, even if the connection terminal 32V-1 is joined to the overlapping portion 42V while the bent portion 42R protrudes out farther in the axial direction of the stator than the connection terminal 32V-1, the joining, length of the connection terminal 32V-1 and the overlapping portion 42V excluding the bent portion 42R is able to be sufficiently ensured, similar to the joining length of both end portions 42U and 42W of the neutral point bus bar 42 and the connection terminals 32U-1 and 32W-1 of the segment coils 22U and 22W. Therefore, the joinability by welding of the overlapping portion 42V of the neutral point bus bar 42 and the connection terminal 32V-1 of the segment coil 22V is able to be improved.

Figure 7:
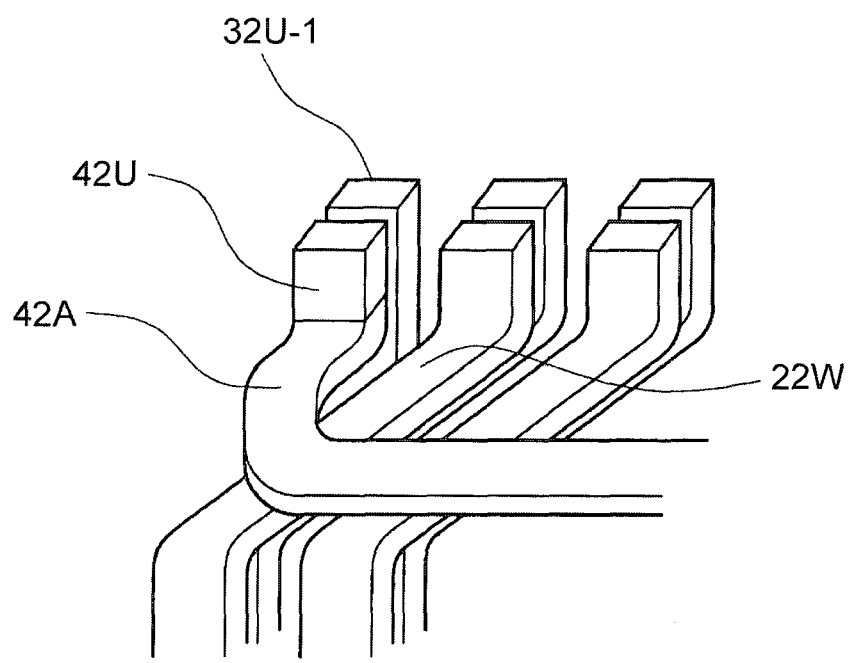
FIG. 7 is a view of an example of the structure of the neutral point bus bar and another of the segment coils.

Moreover, with the neutral point bus bar 42, the bus bar portion 42A that is positioned to the other side of the one end portion 42U in the axial direction of the stator is bent so as to be positioned farther to the outside than the one end portion 42U in the radial direction of the stator, so interference between the bus bar portion 42A and the segment coils (the segment coil 22W in the example in FIG. 7), as shown in FIG. 7. Similarly, the bus bar portion 42B that is positioned to the other side of the overlapping portion 42V in the axial direction of the stator is bent so as to be positioned farther to the outside than the overlapping portion 42V in the radial direction of the stator, and the bus bar portion 42C that is positioned to the other side of the other end portion 42W in the axial direction of the stator is bent so as to be positioned farther to the outside than the other end portion 42W in the radial direction of the stator, so interference between the bus bar portions 42B and 42C and the segment coils is able to be avoided. Therefore, interference between the neutral point bus bar 42 and the segment coils 22U, 22V, and 22W is able to be avoided without changing the shapes of the segment coils 22U, 22V, and 22W.

While modes for carrying out the invention, i.e., example embodiments, have been described, the invention is not limited to the example embodiments, but may be carried out in any of a variety of modes without departing from the scope thereof.

The invention claimed is:

1. A stator for a rotary electric machine, the stator comprising:
    a stator core;
    three-phase coils that are wound around the stator core; and
    a neutral point connection conductor that is connected to each of the three-phase coils, the neutral point connection conductor including a single continuous linear conductor that is bent, the linear conductor including two end portions and an overlapping portion in which the conductor is folded back and doubled up, wherein the overlapping portion is in a position between the two end portions along a length of the linear conductor, one of the two end portions being connected to one-phase coil of the three-phase coils, the other of the two end portions being connected to another-phase coil of the three-phase coils, and the overlapping portion being connected to the remaining-phase coil of the three-phase coils, wherein
    an end portion of the overlapping portion in an axial direction of the stator includes a bent portion resulting from the conductor being folded back, the bent portion being positioned farther in the axial direction of the stator than the two end portions of the linear conductor, wherein an axial length of the overlapping portion is longer than an axial length of each of the two end portions.

2. The stator according to claim 1, wherein the linear conductor is a flat member, having a rectangular cross-section.

3. A stator for a rotary electric machine, the stator comprising:
    a stator core;
    three-phase coils that are wound around the stator core; and
    a neutral point connection conductor that is connected to each of the three-phase coils, the neutral point connection conductor including a single continuous linear conductor that is bent, the linear conductor including two end portions and an overlapping portion in which the conductor is folded back and doubled up, wherein the overlapping portion is in a position between the two end portions along a length of the linear conductor, one of the two end portions being connected to one-phase coil of the three-phase coils, the other of the two end portions being connected to another-phase coil of the three-phase coils, and the overlapping portion being connected to the remaining-phase coil of the three-phase coils, wherein
    an end of the overlapping portion in an axial direction of the stator included a bent portion resulting from the conductor being folded back, the bent portion being positioned farther in the axial direction of the stator than the two end portions of the linear conductor, wherein the overlapping portion is folded back on itself so that a first part of the overlapping portion is disposed radially outward from a second part of the overlapping portion, the first part and the second part overlap in a radial direction.

4. The stator according to claim 3, wherein the linear conductor is a flat member, having a rectangular cross-section.

* * * * *